United States Patent
Bulicz et al.

(10) Patent No.: US 6,439,194 B2
(45) Date of Patent: Aug. 27, 2002

(54) MODIFIED LEAD INJECTOR

(75) Inventors: Tytus R. Bulicz, Palos Hills; William C. Rudhman, Elmhurst, both of IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/771,523

(22) Filed: Jan. 29, 2001

Related U.S. Application Data

(60) Provisional application No. 60/179,360, filed on Jan. 31, 2000.

(51) Int. Cl.⁷ ............................................. F02D 41/14
(52) U.S. Cl. ....................................... 123/299; 123/446
(58) Field of Search ................................. 123/299, 446

(56) References Cited

U.S. PATENT DOCUMENTS

| | | | |
|---|---|---|---|
| 4,546,739 A | * | 10/1985 | Nakajima et al. ........... 123/299 |
| 5,103,785 A | * | 4/1992 | Henkel ........................ 123/299 |
| 5,482,016 A | * | 1/1996 | Ohishi et al. ................ 123/299 |
| 5,492,098 A | | 2/1996 | Hafner et al. |
| 6,073,608 A | * | 6/2000 | Krieger et al. .............. 123/299 |

OTHER PUBLICATIONS

Navistar International Transportation Corp., "Heui Fuel System Operation," catalog, Feb., 1995.

* cited by examiner

*Primary Examiner*—Erick Solis
(74) *Attorney, Agent, or Firm*—Dennis Kelly Sullivan; Gilberto Hernandez; Jeffrey P. Calfa

(57) ABSTRACT

A fuel system for a diesel engine having a plurality of combustion chambers, the engine having ignition cackle occurring in at least one combustion chamber includes a standard fuel injector being associated with each of the non-cackling combustion chambers, and a non-standard fuel injector being associated with each of the cackling combustion chambers, each of the non-standard fuel injectors having an increased pilot volume of fuel, the increased pilot volume of fuel having a quantity of fuel therein for injection into the associated combustion chamber. A non-standard fuel injector and a method for affecting cackle are also included.

27 Claims, 5 Drawing Sheets

MODIFIED LEAD INJECTOR

The present application claims the benefit of U.S. Provisional application Ser. No. 60/179,360, filed Jan. 31, 2000 and incorporated herein in its entirety by reference.

TECHNICAL FIELD

The present invention relates generally to hydraulically-actuated fuel injection systems and, more particularly, to devices and methods for eliminating the phenomenon known as "cackle".

BACKGROUND OF THE INVENTION

Hydraulically actuated electronically controlled unit injectors (HEUI injectors) are known in the art. See U.S. Pat. No. 5,492,098 to Hafner et al., incorporated herein by reference. Engines with HEUI injectors are known to produce a noise referred as cackle when the fuel injected during the pilot or pilot portion of an injection event is insufficient to initiate combustion. The main injection portion of the injection event that follows such pilot injection typically produces a higher rate of pressure rise than is experienced following normal pilot injection. The higher rate of pressure rise during main injection results in an audible cackle sound that can be misinterpreted as a major engine mechanical problem. The cackle phenomenon is not harmful to the engine, but the sound has caused user concern and has resulted in unnecessary visits to dealers with perceived engine problems which in turn has resulted in increased (and unnecessary) warranty costs for engines in the field with HEUI injectors.

Cackle is a phenomenon which occurs if the pilot injection for a particular cylinder is compromised due to incomplete fill of the fuel pumping volume (the high pressure pump chamber) in the HEUI injector. This manifests itself in insufficient fuel injected into the cylinder to initiate combustion with the pilot injection alone and consequently the ensuing main injection yields a higher rate of cylinder pressure rise than other cylinders, thereby causing a non-rhythmic noise that is frequently misdiagnosed as a major mechanical problem. The partial noise that is frequently misdiagnosed as a major mechanical problem. The partial fill of the injector pumping volume that results in cackle may be caused by one of the following:

low fuel pressure resulting from fuel pump, pressure regulating valve or check valve problems;

high fuel pressure fluctuation (adverse fuel rail dynamics) caused by disturbances of nearby cylinders (cylinder 6 to cylinder 8, for example); or other deficiencies, for example, combustion gas leakage past a copper injector gasket.

Note that the firing order in a typical V8 type engine is 1-2-7-3- 4-5-6-8. The number six cylinder and the number eight cylinder are immediately adjacent to one another on the left bank of cylinders. Accordingly, it is the high pressure fuel spill of the number six cylinder immediately preceding the filling of the pumping volume of the number eight cylinder that can cause high fuel pressure fluctuation, resulting in the partial fill of the pumping volume of the number eight cylinder. This results in cackle experienced in the number eight cylinder. Note further that such engines have incorporated substantially identical injectors to serve each of the cylinders.

In the past, certain engines have utilized a fuel pressure accumulator to eliminate the cackle problem. Engines, including the engine described hereinafter, have incorporated check valves, a dead-headed fuel system, and fuel system calibration to help reduce cackle. However, these expedients still have not fully resolved the cackle problem and there is still a need for a solution to the cackle problem.

SUMMARY OF THE INVENTION

The present invention substantially meets the aforementioned needs of the industry. Controlling the quantity of fuel injected during the pilot portion of the injection event has been determined to be the critical factor in eliminating the cackle sound. Installing an injector with a long lead in the cackling cylinder assures an adequate quantity of fuel injected during the pilot portion of the injection event to ensure ignition of the pilot portion and thereby eliminating the cackle sound that occurs during the ensuing portion of the injection event. The injector of the present invention increases injector lead and thereby increases the quantity of fuel injected during the pilot portion of the injection event. This cures cackle because it assures that sufficient fuel is injected initially during the injection event to support combustion during the pilot portion of the injection event, without regard to adverse fuel rail dynamics.

The present invention is a fuel system for a diesel engine having a plurality of combustion chambers, the engine having ignition cackle occurring in at least one combustion chamber includes a standard fuel injector being associated with each of the non-cackling combustion chambers, and a non-standard fuel injector being associated with each of the cackling combustion chambers, each of the non-standard fuel injectors having an increased pilot volume of fuel, the increased pilot volume of fuel having a quantity of fuel therein for injection into the associated combustion chamber. The present invention is also a non-standard fuel injector and a method for affecting cackle.

DETAILED DESCRIPTION OF THE INVENTION

Figure 1:
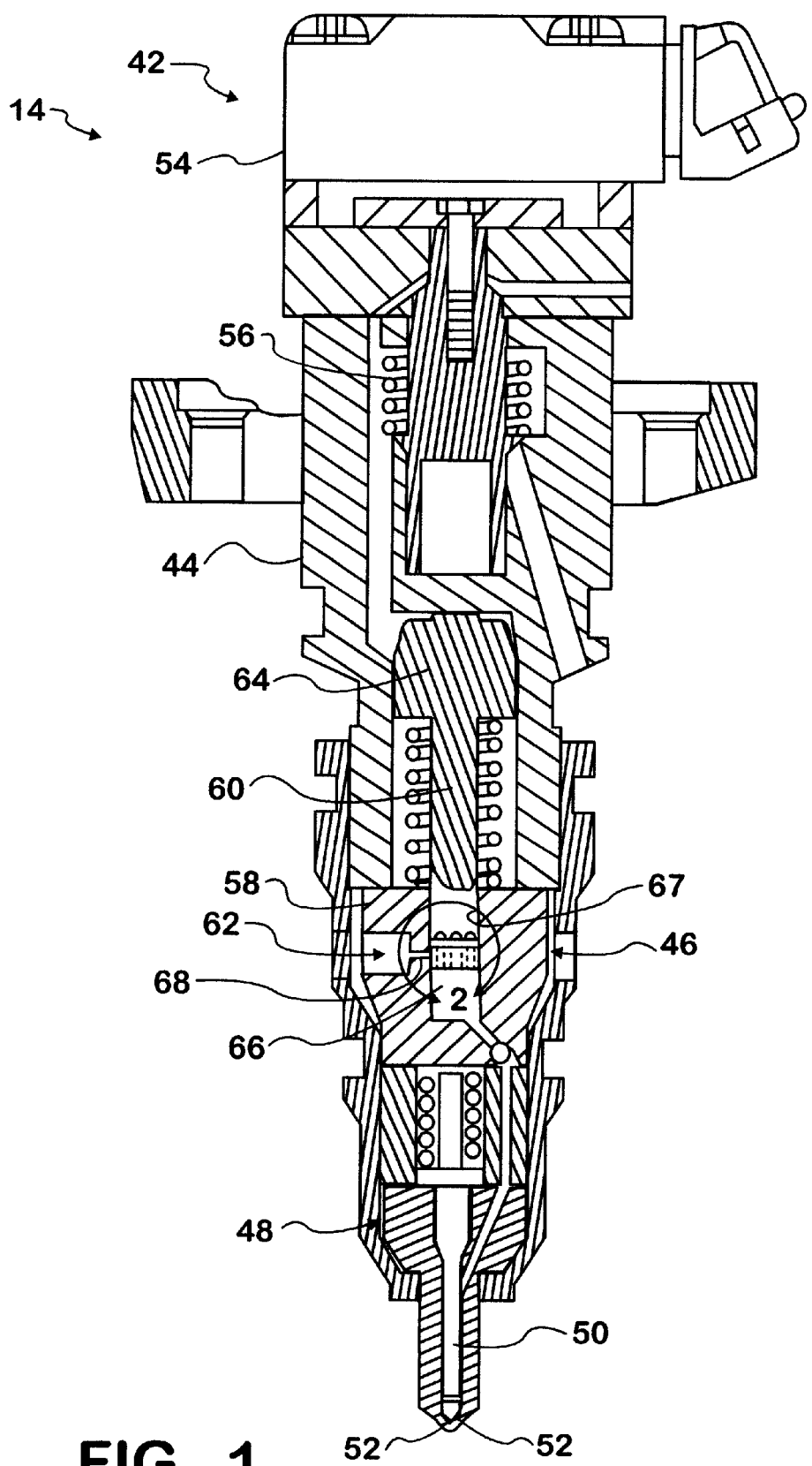
FIG. 1 is a cross sectional view of the HEUI injector of the present invention.
Figure 7:
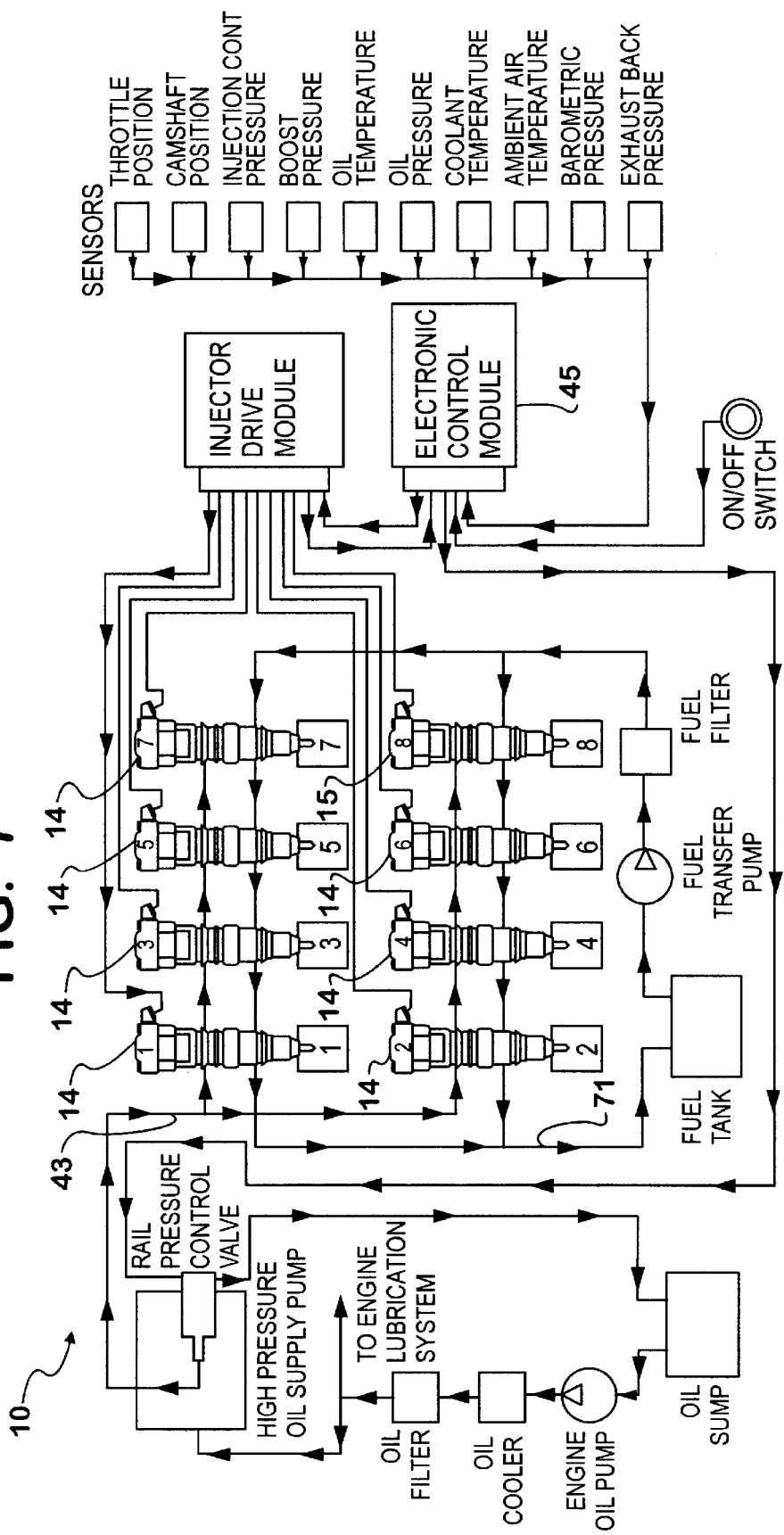
FIG. 7 is a schematic representation of the fuel system of the present invention where cylinder 8 is the cackling cylinder.

The fuel system of the present invention is shown generally at 10 of FIG. 7. The injector of the present invention is shown generally at 15 in the figures. Referring to FIG. 1, a standard injector 14 and the non-standard injector 15 of the present invention are preferably hydraulically-actuated unit pump-injectors (HEUI injector). It should be noted that the injector 15 is a modification of the injector 14 and the general description below describes both of the injectors 14, 15. The inventive modifications included in the non-standard injector 15 are noted below. The injectors 14, 15 generally include an electrical actuator and control valve assembly 42, a body 44, a plunger and barrel assembly 46, and an injection nozzle assembly 48 having a movable flow check 50 and one or more fuel spray orifices 52.

The actuator and valve assembly 42 serves as a means or device for selectively communicating relatively high pressure actuating fluid (preferably engine lubricating oil) from a manifold 43 (see FIG. 7) to the respective injectors 14, 15 in response to receiving an electrical control signal from an injection system electronic control module 45. The assembly 42 includes an electrical actuator 54 and a single actuating fluid control valve 56. For example, the actuator 54 may be an on/off-solenoid and the valve 56 may be a poppet valve connected to a movable armature of the solenoid.

The plunger and barrel assembly 46 includes a barrel 58, a reciprocal fuel pump plunger 60, and a spill control device 62 for temporarily or intermittently spilling fuel during the pumping stroke of the plunger 60. The spill control device 62 spills a portion of fuel contained in the high pressure fuel circuit of the injectors 14, 15 between the plunger 60 and injection nozzle assembly 48. The barrel 58 and the plunger 60 each define in part the variable volume high pressure fuel pump chamber 66. The chamber 66 comprises the variable injector pumping volume referred to above.

FIG. 1 depicts an actuating fluid piston 64 integrally connected to the plunger 60. Alternatively, the piston 64 may be a separate movable component positioned adjacent to the plunger 60. Preferably, the actuating fluid piston 64 has a larger effective diameter than the fuel pump plunger 60 in order to effect a pressure intensification of the fuel contained in the high pressure fuel pump chamber 66 and in the rest of the high pressure fuel circuit of the injectors 14, 15 leading to the spray orifices 52.

Preferably, the spill control device 62 temporarily or intermittently spills a portion of the fuel from the high pressure, variable volume, pump chamber 66 (defined by the plunger 60 in cooperation with the bore of the barrel 58) during each downward or pumping stroke of the plunger 60.

Referring to FIGS. 1–5, the spill control device 62 is depicted. The spill control device 62 includes at least one spill port 68 defined in the barrel 58 and at least one spill passage 70 defined in the movable plunger 60 for intermittently communicating a portion of the fuel from the pump chamber 66 with the spill port 68 during the pumping stroke of the plunger 60. The spill port 68 intersects the plunger bore 67 of the barrel 58 in which the plunger 60 reciprocates. The spill port 68 also communicates with a relatively low pressure fuel circuit 71 (see FIG. 7) supplying fuel to the injectors 14,15.

The spill passage 70 includes one or more internal axial passages 72 defined in the plunger 60 and a circumferential outer groove or annular slot 74 encircling the plunger 60. The groove 74 is preferably generally cylindrical in shape. The groove 74 is spaced from the plunger head 70 of the plunger 60. The width dimension of the groove 74 and the distance dimension of the groove 74 from the plunger head 70 affect injector lead. The plunger head 70 faces the fuel pump chamber 66 and defines in part the fuel pump chamber 66. The passages 72 are arranged in continuous fluid communication between the fuel pump chamber 66 and the circumferential groove 74. The circumferential groove 74 is arranged to be in intermittent fluid communication with the spill port 68, the barrel 58 during the pumping stroke of the plunger 60. The groove 64 defines a land 69 that extends between the plunger head 70 and the groove 74 and a trailing land 71 disposed upward of the groove 74 in the figures. The width dimension of the land 69 affects injector lead.

The axial distance between the upper edge (the edge furthest from the fuel pump chamber 66) of the spill port 68 and the leading edge (closest to the fuel pump chamber 66) of the circumferential groove 74 controls in part the initial rate of fuel injection (the pilot injection) of an injection event. The axial distance may be referred to as lead. As indicated above, other factors also affect lead, including, for example, the distance dimension between the groove 74 and the plunger head 70, the width dimension of the groove 74, and the distance dimension of the spill port 68 from the plunger head to when the plunger 60 is fully retracted. The standard fuel injector 14 has a standard lead dimension defined within known manufacturing tolerances.

By changing the geometry of the plunger 60 and the barrel 58 (and the spill port 68), the quantity of fuel injected during the pilot portion of the injection event is variable. After commencement of the compressing downstroke of the plunger 60, a relatively longer lead of the non-standard injector 15 of the present invention delays spilling of fuel pressure to the spill port 68, thereby ensuring a desired (generally increased) volume of fuel is injected into the cylinder combustion chamber during the pilot portion, as will be described in greater detail below. This volume of fuel is adequate to ensure combustion during the pilot portion of the injection event.

Figure 2:
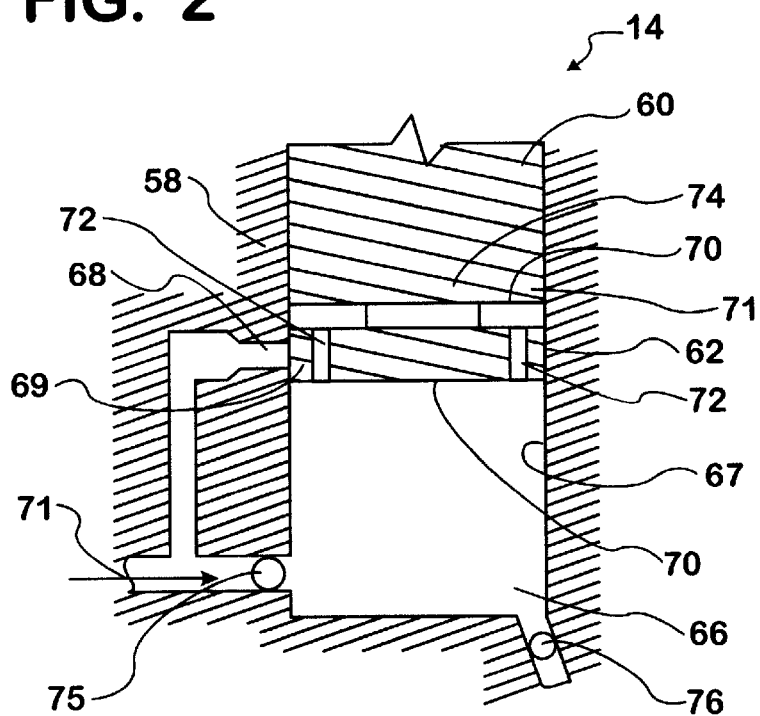
FIG. 2 is a sectional view of the portion of the injection of FIG. 1 within the circle 2 during the fill stage prior to an injection event.

The operation of the fuel injectors 14, 15 of the present invention is depicted sequentially in FIGS. 2–5. As depicted in FIG. 6, the injection event generally has a pilot portion that generally is left of about 7° after top dead center (TDC)crank angle followed by main injection that is generally right of about 7° AFTER TDC crank angle. Referring to FIG. 2, the plunger 60 is fully retracted and the land 69 of the plunger 60 covers the spill port 68 of the barrel 58. The fuel inlet check valve 75 is open, admitting relatively low pressure fuel to the fuel pump chamber 66. The high pressure fuel check valve 76 is closed, sealing off the fuel pump chamber 66. The fuel in the fuel pump chamber 66 flows through the passages 72 to flood the groove 74.

Figure 3:
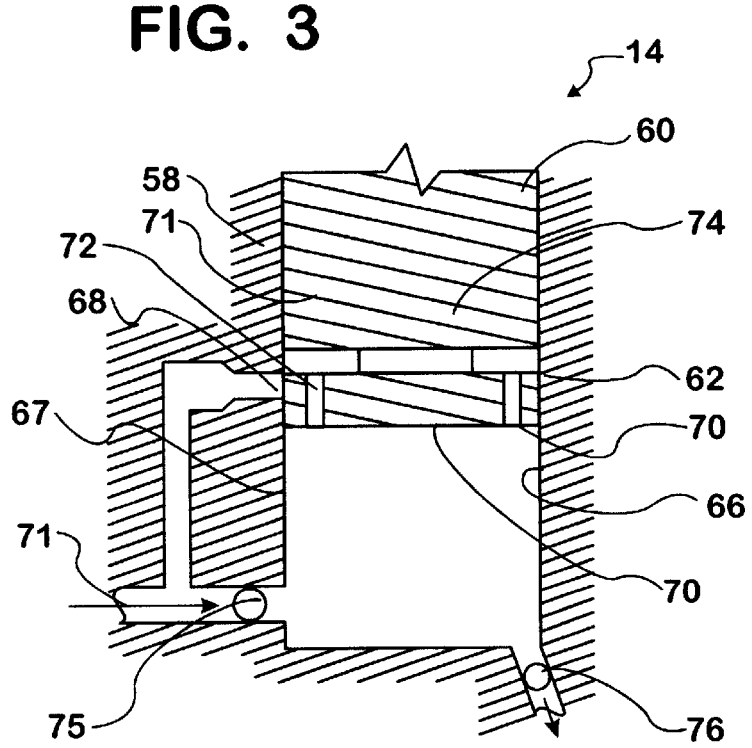
FIG. 3 is the injector of FIG. 2 during the pilot portion of an injection event.

Referring to FIG. 3, when the injection system electronic control module energizes the solenoid 54 of the respective injectors 14, 15, the control valve 56 is pulled off its high pressure seat to admit high pressure actuating fluid (typically engine oil) into the injectors 14, 15. The actuating fluid hydraulically actuates or directly drives the plunger 60 downward to begin a pumping stroke. Fuel in the fuel pump chamber 66 is pressurized by the plunger 60 so that the fuel pressure increases in the fuel pump chamber 66. The increasing pressure closes the fuel inlet check valve 75 and opens the high pressure fuel check valve 76. When the increasing pressure of the fuel reaches the valve opening pressure of the injection nozzle assembly 48, the check 50 unseats to begin the initial pilot or pilot injection of fuel through the spray orifices 52. The cylinders 1–8 are depicted in FIG. 7, a standard injector 14 being associated with cylinders 1–7 and a non-standard injector 15 being associated with the cackling number 8 cylinder. Referring to the curve for cylinders 2, 4, 6 in FIG. 6, this initial portion of the injection of fuel comprising the pilot portion occurs between about 10° BEFORE TDC crank angle and 7° AFTER TDC crank angle. It should be noted that during the same crank angle span, the cylinder pressure trace for cylinder 8 (the cackling cylinder) is less than for the aforementioned cylinders when cylinder 8 is served by a prior art standard injector 14 as distinct from the non-standard injector 15 of the present invention. This indicates that the fuel supply for cylinder 8 is insufficient to cause combustion during the pilot portion of the injection event.

Such insufficiency could occur in any cylinder, but cylinder number 8 in a V8 type engine is particularly susceptible to a reduced quantity for pilot injection when cylinder 8 is served by a prior art standard injector 14. This results from the fact that the left bank of cylinders of a V8 engine being cylinders number 2, 4, 6 and 8, as depicted in FIG. 7, and the firing order being 1-2-7-3-4-5-6-8 means that the cylinder immediately next to cylinder number 8 (cylinder number 6) fires immediately prior to cylinder number 8. The result may be insufficient fuel to completely fill the pumping volume of the fuel pump chamber 66 resulting in insufficient fuel injected during the pilot portion of the injection event to initiate combustion in the cylinder combustion chamber. This insufficiency will produce cackle during the main injection portion of the injection event, as described below.

Figure 4:
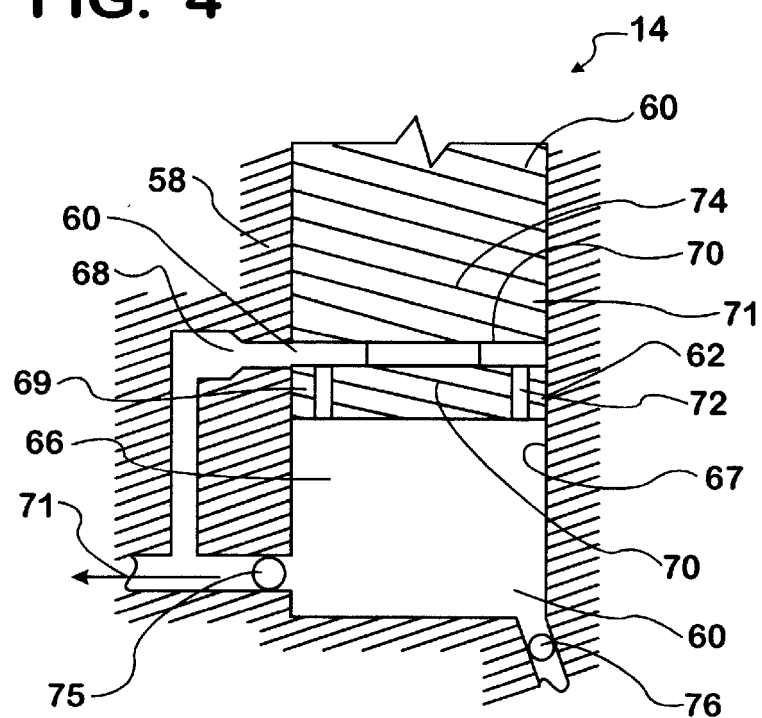
FIG. 4 is a sectional view of the injector of FIG. 2 during the pressure relief portion of the injection event.

Referring to FIG. 4, as the plunger 60 continues moving downwardly on its pumping stroke, the circumferential groove 74 of the plunger 60 communicates with the spill port 68 of the barrel 58 so that a portion of the high pressure fuel in the pump chamber 66 is spilled into the port 68. The fuel pressure in the fuel pump chamber 66 is thereby temporarily reduced. The high pressure check valve 76 closes. This causes the check 50 (FIG. 1) to seat, thereby ceasing delivery of fuel via orifices 52. The inlet check valve 75 remains closed. Referring again to FIG. 6 in the curves for cylinders 2, 4, and 6, the temporary reduction in pressure occurs generally between about 5 and 10° AFTER TDC crank angle. During the same crank angle duration, the trace for cylinder 8 indicates that the pressure fall off is much greater as a result of there having been insufficient fuel injected during the pilot portion of the injection event to initiate combustion when cylinder 8 is served by a prior art standard injector 14.

Figure 5:
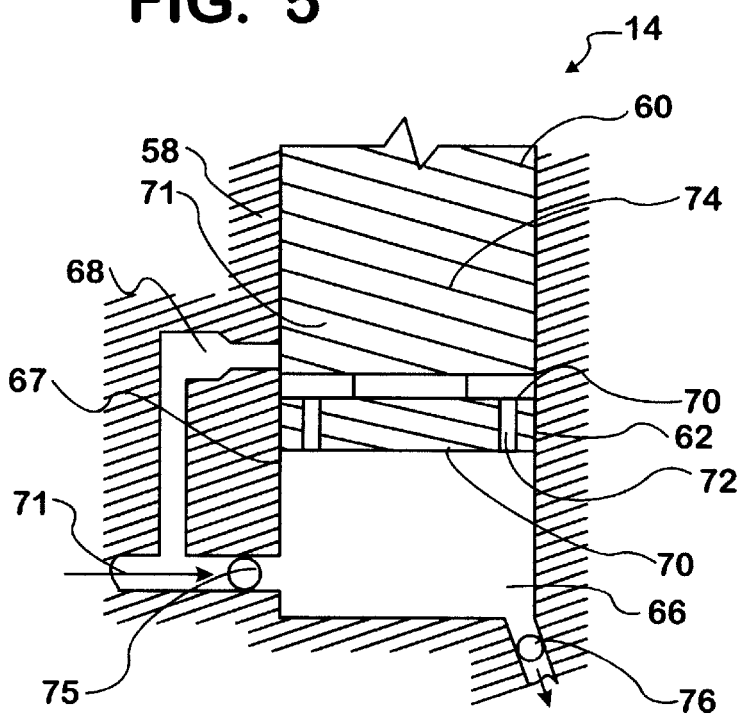
FIG. 5 is a sectional depiction of the injector of FIG. 2 during the main injection portion of the injection event.
Figure 6:
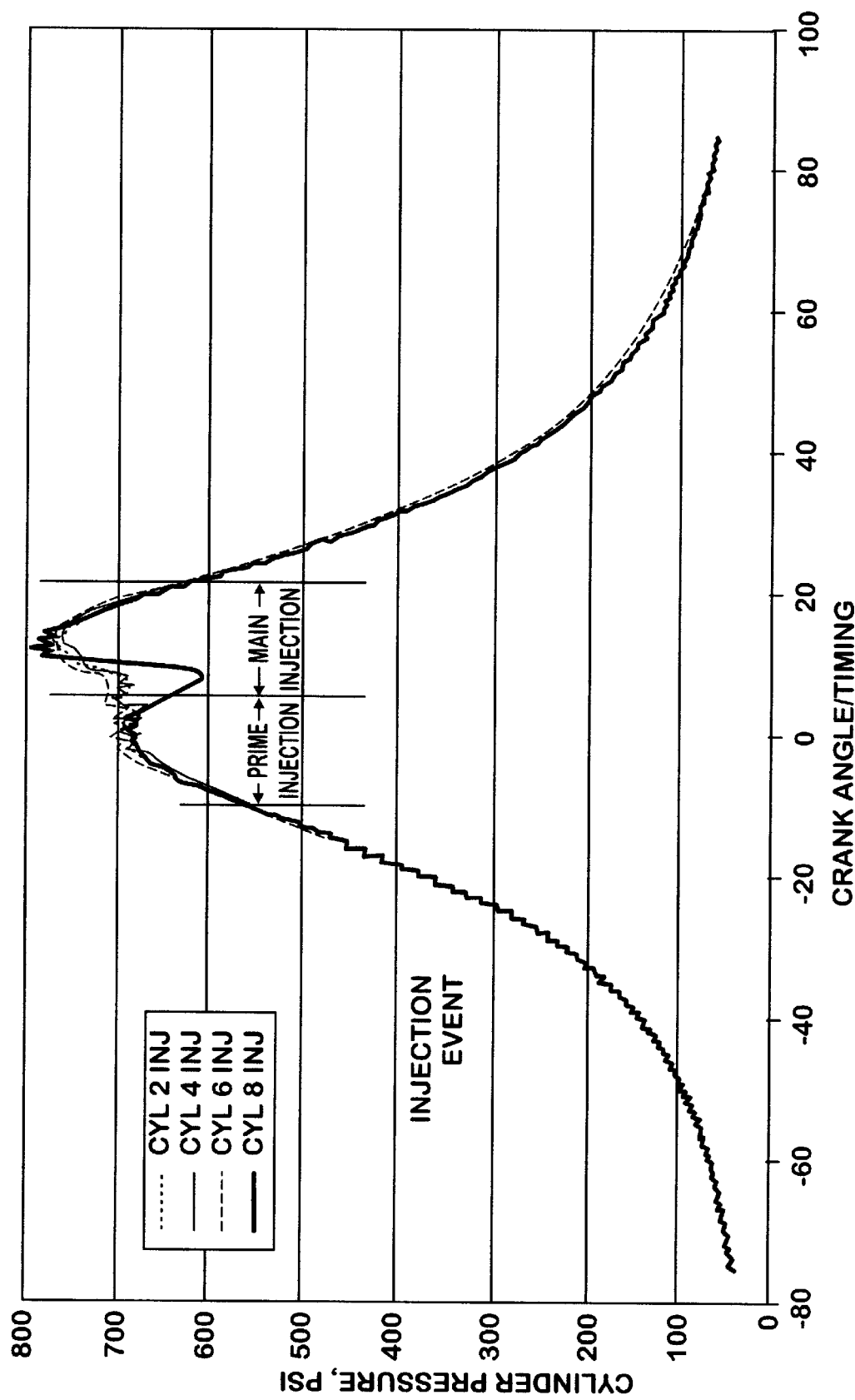
FIG. 6 is a graphic depiction of cylinder pressure v. crank angle of an eight cylinder, V-type engine for cylinders 2, 4, 6 and 8 all on the left bank of cylinders of a prior art fuel system.

Referring to FIG. 5, as the plunger 68 continues moving downwardly on its pumping stroke, the trailing land 71 of the plunger 60 blocks the spill port 68 and the circumferential groove 74 no longer is in fluid communication with the spill port 68. The fuel pressure in the fuel pump chamber 66 again rises, opening the high pressure check valve 76 to again unseat the check 50 and begin the main portion of the injection event by injecting fuel through the orifices 52. Referring to FIG. 6, the rise in the cylinder pressure for cylinders 2, 4, and 6 occurs initially at about 7° AFTER TDC and continues to about 15° AFTER TDC. It is noted that the trace for cylinder 8 indicates that the rise in cylinder pressure is delayed several degrees as compared to the rise for cylinders 2, 4, and 6 when cylinder 8 is served by a prior art standard injector 14. The rise for cylinder 8 is also much steeper and peaks several degrees before the traces for cylinders 2, 4, and 6 at a significantly higher cylinder pressure. The resulting combustion in the chamber at high cylinder pressure produces the objectionable cackle sound during the main portion of the injection event.

The fuel injector 15 of the present invention has a longer lead than the standard injectors 14 used in cylinders 1–7 or in any cylinder in which cackle is not a problem. The expedient of installing a non-standard injector 15 with a longer lead in any cylinder that exhibits cackle effectively eliminates the cackle problem without inducing greater particulate emissions or other adverse engine effects. Tests have shown that the installation of the non-standard injector 15 of the present invention in cylinder 8 results in the trace for cylinder 8 being substantially coincident with the traces of cylinders 2, 4, and 6, the non-cackling cylinders on the left bank.

The effect of increasing the lead of the non-standard injector 15 relative to the standard injector 14 is to increase the length of stroke of plunger 60 that occurs between the initiation of the fuel injection event and the point at which the circumferential groove 74 is in fluid communication with the spill port 68. Such longer stroke ensures that adequate fuel is injected during the pilot portion of the injection event to initiate combustion.

There are a number of different ways in which the lead of the non-standard injector 15 can effectively be increased. A first way is to machine the circumferential groove 74 at a greater distance from the plunger head 70. A second way is to increase the distance of the point of intersection of the spill port 68 with the bore of the barrel 58 to the plunger head 70 (and coincidentally, the distance to the groove 74) when the plunger 60 is in its full retracted position. Increasing the noted distance effectively delays the spill that occurs when the groove 74 intersects the spill port 68 A normal lead length is preferably approximately 0.4 mm. An increased lead length sufficient to ensure combustion during the pilot portion of the injection event is preferably a lead length of approximately 0.45 mm.

What is claimed is:

1. A method of affecting ignition cackle occurring in at least one combustion chamber of a diesel engine having a plurality of combustion chambers, the non-cackling combustion chambers having a standard fuel injector associated with each of such combustion chambers comprising the steps of:

(a) identifying the combustion chamber experiencing the ignition cackle; and (b) increasing the pilot volume of fuel, the fuel in the increased volume for being provided to a fuel injector associated with the identified combustion chamber.

2. The method of claim 1 including increasing the pilot volume of fuel provided sufficiently to ensure that a volume of fuel injected during a pilot portion of an injection event is sufficient to support combustion during the pilot portion of the injection event.

3. The method of claim 2 including delaying the spilling of fuel from an injector chamber after initiation of the injection event.

4. The method of claim 3 including providing a relatively long lead for the fuel injector.

5. The method of claim 1 including altering the geometry of a standard injector plunger and barrel, the plunger being translatably disposed in the barrel, the barrel being defined in the injector, the alteration effecting the increased pilot quantity of fuel provided to the fuel injector associated with the identified combustion chamber.

6. The method of claim 5 including defining a circumferential groove on the plunger at a relatively greater distance from a plunger head than a corresponding groove on the plunger of the standard fuel injector, the groove being selectively intersectable with a spill port defined in the barrel.

7. The method of claim 5 including displacing a point of intersection of a spill port with the barrel a greater distance from a plunger head than a corresponding distance in the standard fuel injector.

8. The method of claim 4 including providing a lead for the fuel injector that is greater than 0.4 mm.

9. The method of claim 8 including providing a lead for the fuel injector that is about 0.45 mm.

10. A fuel system for a diesel engine having a plurality of combustion chambers, the engine having ignition cackle occurring in at least one combustion chamber, comprising:

(a) a standard fuel injector being associated with each of the non-cackling combustion chambers; and (b) a non-standard fuel injector being associated with each of the cackling combustion chambers, each of the non-standard fuel injectors having an increased pilot volume of fuel, the fuel in the increased volume for injection into the associated combustion chamber during a pilot portion of an injection event.

11. The fuel system of claim 10 including increasing the volume of pilot fuel available in the non-standard injector sufficiently to ensure that a quantity injected during a pilot portion of an injection event supports combustion during the pilot portion of the injection event.

12. The fuel system of claim 11 wherein the non-standard fuel injector includes an injector chamber, the spilling of fuel from the injector chamber being relatively delayed after initiation of the injection event as compared to a spilling of fuel that occurs in a standard injector.

13. The fuel system of claim 12 wherein the non-standard fuel injector has a relatively long lead.

14. The fuel system of claim 10 wherein the geometry of a plunger and a barrel disposed in the non-standard fuel injector, the plunger being translatably disposed in the barrel, is altered to effectively increase an injector chamber volume, thereby effecting the increased pilot quantity of fuel provided by the non-standard fuel injector for injection into the associated combustion chamber.

15. The fuel system of claim 14 including a circumferential groove being defined on the plunger at a relatively greater distance from a plunger head than a corresponding groove on the plunger of a standard fuel injector, the groove being selectively intersectable with a spill port defined in the barrel.

16. The fuel system of claim 14 wherein a point of intersection of a spill port with the barrel is displaced a greater distance from a plunger head than a corresponding distance in a standard fuel injector.

17. The fuel system of claim 13 wherein a lead for the non-standard fuel injector is greater than 0.4 mm.

18. The fuel system of claim 17 wherein the lead for the non-standard fuel injector is about 0.45 mm.

19. A non-standard fuel injector for use in a fuel system for a diesel engine, the diesel engine having a plurality of combustion chambers, a standard fuel injector being associated with each of at least some of the plurality of combustion chambers, the engine having ignition cackle occurring in at least one combustion chamber comprising:

(a) the non-standard fuel injector being associated with each of the cackling combustion chambers, each of the non-standard fuel injectors having an increased pilot volume for fuel as compared to a pilot volume of fuel of a standard fuel injector, the increased pilot volume for containing a quantity of fuel for injection into the associated combustion chamber.

20. The non-standard fuel injector of claim 19 including increasing the quantity of pilot fuel provided by the non-standard injector sufficiently to ensure that a quantity of fuel injected during a pilot portion of an injection event supports combustion during the pilot portion of the injection event.

21. The non-standard fuel injector of claim 20 wherein the non-standard fuel injector includes an injector chamber, the spilling of fuel from the injector chamber being relatively delayed after initiation of the injection event as compared to a spilling that occurs in a standard injector.

22. The non-standard fuel injector of claim 21 wherein the non-standard fuel injector has a relatively long lead.

23. The non-standard fuel injector of claim 19 including a plunger and a barrel, the plunger being translatably disposed in the barrel, the geometry of the plunger and barrel being altered relative to the corresponding geometry of a standard fuel injector to effectively increase an injector chamber volume, thereby effecting the increased pilot quantity of fuel provided by the non-standard fuel injector for injection into the associated combustion chamber.

24. The non-standard fuel injector of claim 23 including a circumferential groove being defined on the plunger at a relatively greater distance from a plunger head than a corresponding groove on the plunger of a standard fuel injector, the groove being selectively intersectable with a spill port defined in the barrel.

25. The non-standard fuel injector of claim 23 wherein a point of intersection of a spill port with the barrel is displaced a greater distance from a plunger head than a corresponding distance in a standard fuel injector.

26. The non-standard fuel injector of claim 21 wherein a lead for the non-standard fuel injector is greater than 0.4 mm.

27. The non-standard fuel injector of claim 26 wherein the lead for the non-standard fuel injector is about 0.45 mm.

* * * * *